United States Patent
Chen et al.

(10) Patent No.: US 7,913,289 B2
(45) Date of Patent: *Mar. 22, 2011

(54) METHOD AND APPARATUS FOR SECURITY POLICY AND ENFORCING MECHANISM FOR A SET-TOP BOX SECURITY PROCESSOR

(75) Inventors: Xuemin Chen, San Diego, CA (US); Iue-Shuenn Chen, San Diego, CA (US); Carolyn Bell Walker, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 1252 days.

This patent is subject to a terminal disclaimer.

(21) Appl. No.: 11/136,175

(22) Filed: May 23, 2005

(65) Prior Publication Data

US 2006/0265733 A1 Nov. 23, 2006

(51) Int. Cl.
*G06F 17/00* (2006.01)
*H04L 29/06* (2006.01)
(52) U.S. Cl. .................................. 726/1; 726/2; 726/27
(58) Field of Classification Search .................. 726/1, 2, 726/27
See application file for complete search history.

(56) References Cited

U.S. PATENT DOCUMENTS

| | | | |
|---|---|---|---|
| 6,028,937 A | 2/2000 | Tatebayashi et al. | |
| 6,038,563 A | 3/2000 | Bapat et al. | |
| 6,182,089 B1 * | 1/2001 | Ganapathy et al. | 1/1 |
| 6,381,747 B1 * | 4/2002 | Wonfor et al. | 725/104 |
| 6,586,968 B1 * | 7/2003 | Schauer et al. | 326/86 |
| 6,785,721 B1 * | 8/2004 | Immerman et al. | 709/220 |
| 6,850,252 B1 | 2/2005 | Hoffberg | |
| 6,880,005 B1 * | 4/2005 | Bell et al. | 709/225 |
| 6,880,113 B2 * | 4/2005 | Anderson et al. | 714/45 |
| 6,948,183 B1 * | 9/2005 | Peterka | 725/25 |
| 6,950,818 B2 * | 9/2005 | Dennis et al. | 1/1 |
| 6,970,462 B1 * | 11/2005 | McRae | 370/392 |
| 7,147,558 B2 * | 12/2006 | Giobbi | 463/25 |
| 7,176,791 B2 * | 2/2007 | Sakaki et al. | 340/502 |
| 7,227,842 B1 * | 6/2007 | Ji et al. | 370/235 |
| 7,236,493 B1 * | 6/2007 | McRae | 370/392 |
| 7,263,367 B1 * | 8/2007 | Sabot | 455/456.1 |
| 7,317,723 B1 * | 1/2008 | Guru | 370/392 |
| 7,340,469 B1 * | 3/2008 | Alghathbar et al. | 707/10 |
| 7,350,204 B2 * | 3/2008 | Lambert et al. | 717/172 |

(Continued)

OTHER PUBLICATIONS

Federal Information Processing Standards Publication, Fips Pub 46-3, *Data Encryption Standard (DES)*, Oct. 25, 1999.

*Primary Examiner* — David García Cervetti
(74) *Attorney, Agent, or Firm* — McAndrews, Held & Malloy, Ltd.

(57) ABSTRACT

In multimedia systems that implement secure access techniques, a method and apparatus for a security policy and enforcing mechanism for a set-top box security processor are provided. A security policy may be determined for a multimedia terminal based on high-level requirements by various system users. A default mode of operation may be generated based on the security policy and may be stored in a security policy memory. An access control matrix that indicates the operation of security components in a security processor for various user modes may be stored in the security policy memory. Control and/or access operations not supported by the access control matrix may be supported by the default mode of operation. The user modes in the access control matrix may include composition user modes. Accessing the information in the security policy memory may be utilized to enforce the security policy in the multimedia terminal.

26 Claims, 11 Drawing Sheets

U.S. PATENT DOCUMENTS

| | | | |
|---|---|---|---|
| 7,409,707 B2 * | 8/2008 | Swander et al. | 726/13 |
| 7,484,237 B2 * | 1/2009 | Joly et al. | 726/1 |
| 7,487,424 B2 * | 2/2009 | Nam et al. | 714/748 |
| 7,490,333 B2 * | 2/2009 | Grimaud et al. | 719/316 |
| 7,509,673 B2 * | 3/2009 | Swander et al. | 726/11 |
| 7,518,605 B2 * | 4/2009 | Lin et al. | 345/418 |
| 7,549,159 B2 * | 6/2009 | Shay | 726/1 |
| 7,624,424 B2 * | 11/2009 | Morita et al. | 726/1 |
| 7,647,329 B1 * | 1/2010 | Fischman et al. | 1/1 |
| 2002/0099952 A1 * | 7/2002 | Lambert et al. | 713/200 |
| 2003/0041267 A1 * | 2/2003 | Fee et al. | 713/201 |
| 2003/0065982 A1 * | 4/2003 | Grimaud et al. | 714/38 |
| 2003/0070091 A1 * | 4/2003 | Loveland | 713/201 |
| 2003/0081784 A1 * | 5/2003 | Kallahalla et al. | 380/277 |
| 2003/0088786 A1 * | 5/2003 | Moran et al. | 713/201 |
| 2003/0115417 A1 * | 6/2003 | Corrigan | 711/118 |
| 2003/0221030 A1 * | 11/2003 | Pontius et al. | 710/107 |
| 2004/0088558 A1 | 5/2004 | Candelore | |
| 2004/0250131 A1 * | 12/2004 | Swander et al. | 713/201 |
| 2005/0010765 A1 * | 1/2005 | Swander et al. | 713/166 |
| 2005/0021980 A1 * | 1/2005 | Kanai | 713/182 |
| 2005/0022010 A1 * | 1/2005 | Swander et al. | 713/201 |
| 2005/0144475 A1 * | 6/2005 | Sakaki et al. | 713/200 |
| 2005/0234907 A1 * | 10/2005 | Yamagishi et al. | 707/5 |
| 2005/0262132 A1 * | 11/2005 | Morita et al. | 707/102 |
| 2005/0262569 A1 * | 11/2005 | Shay | 726/26 |
| 2005/0262570 A1 * | 11/2005 | Shay | 726/26 |
| 2005/0268342 A1 * | 12/2005 | Shay | 726/26 |
| 2005/0278483 A1 * | 12/2005 | Andruszkiewicz et al. | 711/114 |
| 2006/0075508 A1 * | 4/2006 | Guo et al. | 726/27 |
| 2006/0090084 A1 * | 4/2006 | Buer | 713/189 |
| 2006/0161829 A1 * | 7/2006 | Kobayashi | 714/738 |
| 2006/0236408 A1 * | 10/2006 | Yan | 726/29 |
| 2006/0265734 A1 * | 11/2006 | Chen et al. | 726/2 |
| 2006/0294575 A1 * | 12/2006 | Rogers | 726/1 |
| 2007/0192839 A1 * | 8/2007 | Fee et al. | 726/4 |
| 2009/0313461 A1 * | 12/2009 | Klug | 712/229 |

* cited by examiner

METHOD AND APPARATUS FOR SECURITY POLICY AND ENFORCING MECHANISM FOR A SET-TOP BOX SECURITY PROCESSOR

CROSS-REFERENCE TO RELATED APPLICATIONS/INCORPORATION BY REFERENCE

This application makes reference to U.S. patent application Ser. No. 11/136,027 filed May 23, 2005.

The above stated application is hereby incorporated herein by reference in its entirety.

FIELD OF THE INVENTION

Certain embodiments of the invention relate to accessing secure systems. More specifically, certain embodiments of the invention relate to a method and apparatus for a security policy and enforcing mechanism for a set-top box security processor.

BACKGROUND OF THE INVENTION

In multimedia systems that may be accessed by many different users, creating a secure access control management mechanism may be necessary in order to define and administer the access rights or privileges of the different users. An example of such a multimedia system may be a set-top box where manufacturers, vendors, operators, and/or home users may have an interest in accessing at least some limited functionality of the system. In some instances, a single device, such as a security processor for example, may be utilized to administer access control to various subsystems in a multimedia system. The security processor may operate independently of other components, devices, and/or subsystems in the multimedia system when determining access rights or privileges of different users to various features in the multimedia system. For example, vendors may have limited access to some of the functions that may be accessible by the manufacturer. Home users may only have access to a subset of the vendors' access rights.

In some instances, secure access control may be managed based on an access control matrix that may be generated as part of the multimedia system design to specify access conditions of each security component supported by the system. Table 1 illustrates an access control matrix implemented as a two-dimensional array that comprises the set of rights, R(i,j), that provide the system with the appropriate commands for a particular user i to access a particular security component (SC) j. For example, user 1 may have an R(1,2) access right to security component SC 2, while user i may have an R(i,j) access right to security component SC j.

TABLE 1

Access control matrix in a two-dimensional array.

|        | SC 1   | SC 2   | ...  | SC j   | ...  |
|--------|--------|--------|------|--------|------|
| user 1 | R(1, 1)| R(1, 2)| ...  | R(1, j)| ...  |
| user 2 | R(2, 1)| R(2, 2)| ...  | ...    | ...  |
| ...    | ...    | ...    | ...  | ...    | ...  |
| user i | R(i, 1)| ...    | ...  | R(i, j)| ...  |
| ...    | ...    | ...    | ...  | ...    | ...  |

However, there may be several limitations with such a straightforward implementation. On a typical security system, the number of user modes and security components may be sufficiently large that the size of the access control matrix may require large amounts of memory. There may be a significant number of entries in the access control matrix that may correspond to instances when access rights may not be granted and/or instances when the access rights may be the same for multiple user modes and/or for multiple security components, such as default settings, for example. The addition or removal of user modes or security components may require careful implementation of additional hardware and/or software complexity in order to manage the access control matrix without introducing security concerns that may result from the additional complexity. Moreover, the concurrent operation of more than one user mode may present security concerns when the rights associated with a particular security component result in a conflict between the concurrent user modes.

Specifying access conditions and/or operations in a manner that overcomes at least some of the limitations presented by a security management that is based on an access control matrix implemented as a two-dimensional array may result in a more versatile secure access control management mechanism for multimedia systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

An apparatus and/or method for a security policy and enforcing mechanism for a set-top box security processor, substantially as shown in and/or described in connection with at least one of the drawings, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and apparatus for security policy and enforcing mechanism for a set-top box security processor. A security policy may be determined for a multimedia system based on high-level requirements by various system users. A default mode of operation may be generated based on the security policy and may be stored in a security policy memory. An access control matrix that specifies operation of security components in a security processor for various user modes may be stored in the security policy memory. Control and/or access operations that are not supported by the access control matrix may be supported by the default mode of operation. The user modes in the access control matrix may include composition user modes. The information in the security policy memory may be accessed and utilized to enforce the security policy in the multimedia system. This approach may be utilized to maintain the confidentiality and integrity of the multimedia terminal under a wide range of operating conditions.

Figure 1A:
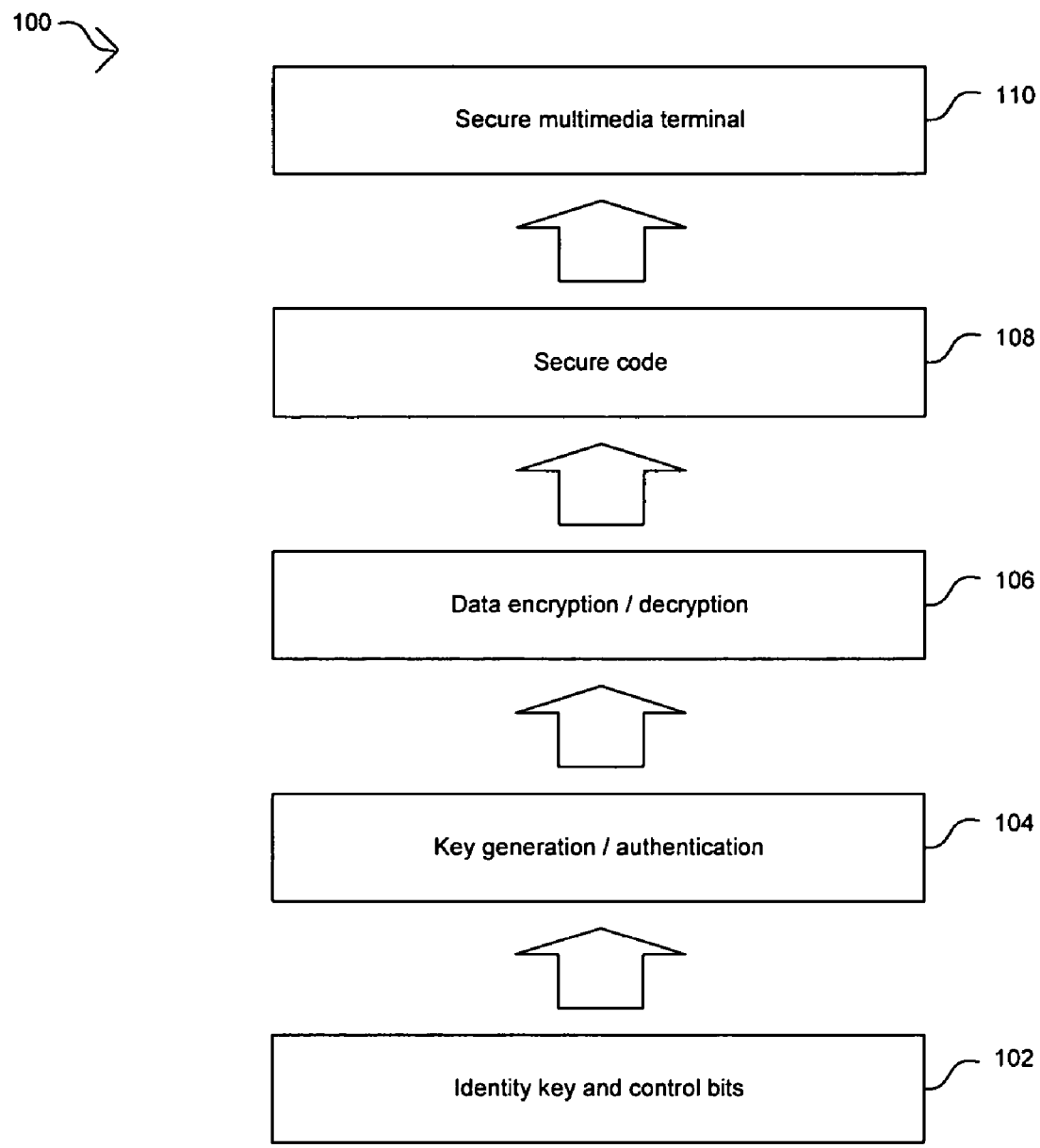
FIG. 1A is a block diagram illustrating a security layer structure in a multimedia system, in accordance with an embodiment of the invention.

FIG. 1A is a block diagram illustrating a security layer structure in a multimedia system, in accordance with an embodiment of the invention. Referring to FIG. 1A, there is shown a security layer structure 100 that illustrates the hierarchical dependency of security layers in a multimedia system such as a set-top box, for example. The security layer structure 100 may comprise a first security layer 102, a second security layer 104, a third security layer 106, a fourth security layer 108, and a fifth security layer 110. The first security layer 102 may correspond to secure identity keys and/or control bits associated with user modes and security features in the multimedia system. The second security layer 104 may correspond to secure key generation and/or key authentication operations in the multimedia system. The third security layer 106 may correspond to secure data encryption and/or data decryption operations in the multimedia system. The fourth security layer 108 may correspond to a secure code in the multimedia system. The fifth security layer 110 may correspond to a secure multimedia terminal or system.

In operation, each security layer in the security layer structure 100 may provide security support for a subsequent or higher level security layer. For example, when the identity of a user mode is compromised in the first security layer 102, subsequent layers, and therefore the multimedia system, may also be compromised. Similarly, when at least a portion of the data encryption and/or decryption operations in the third security layer 106 is compromised, subsequent layers, and therefore the multimedia system, may also be compromised. In this regard, a multimedia system such as a set-top box, may be based on an architectural design that provides layers of security as shown in FIG. 1A.

Figure 1B:
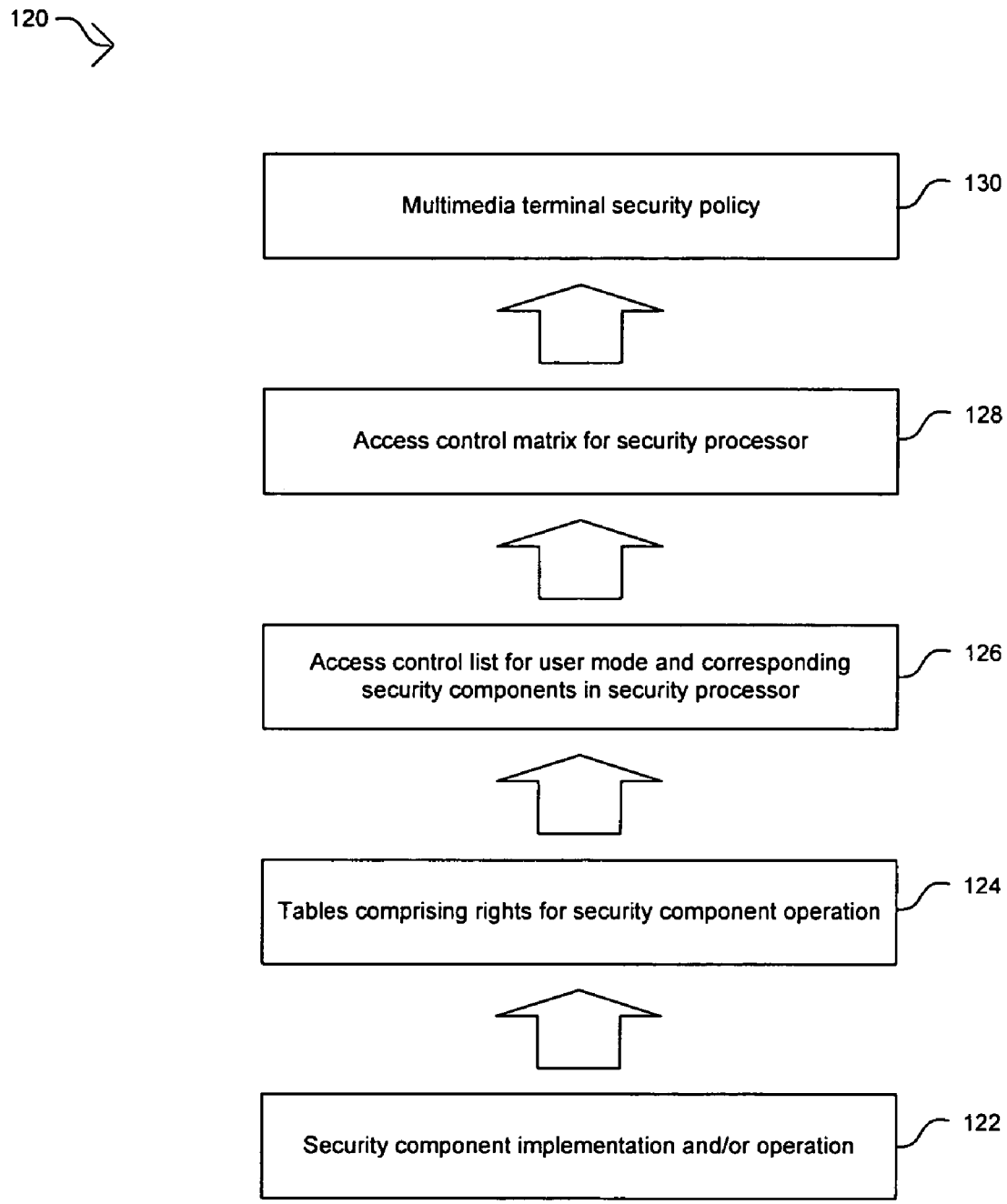
FIG. 1B is a block diagram illustrating a security policy-based security layer structure in a multimedia system, in accordance with an embodiment of the invention.

FIG. 1B is a block diagram illustrating a security policy-based security layer structure in a multimedia system, in accordance with an embodiment of the invention. Referring to FIG. 1B, there is shown a security layer structure 120 that may differ from the security layer 100 in FIG. 1A in that a different security layer architecture may be utilized in for multimedia system. The security layer structure 120 may comprise a first security layer 122, a second security layer 124, a third security layer 126, a fourth security layer 128, and a fifth security layer 130. The first security layer 122 may correspond to the implementation and/or operations of security components in a security processor in the multimedia system. The second security layer 124 may correspond to rules that apply to a user mode for a security component in a security processor in the multimedia system. The third security layer 126 may correspond to an access control list that describes access for a given user mode to the security components in the security processor. The fourth security layer 128 may correspond to an access control list that describes the access for all user modes to the security components in the security processor. The fifth security layer 110 may correspond to a security policy that describes the overall security operation of the multimedia system or terminal. In this regard, the security policy may describe the secure operation of components in the multimedia system, including the security processor. As with the security layer structure 100 in FIG. 1A, each security layer in the security layer structure 120 may provide security support for a subsequent or higher level security layer.

Figure 2A:
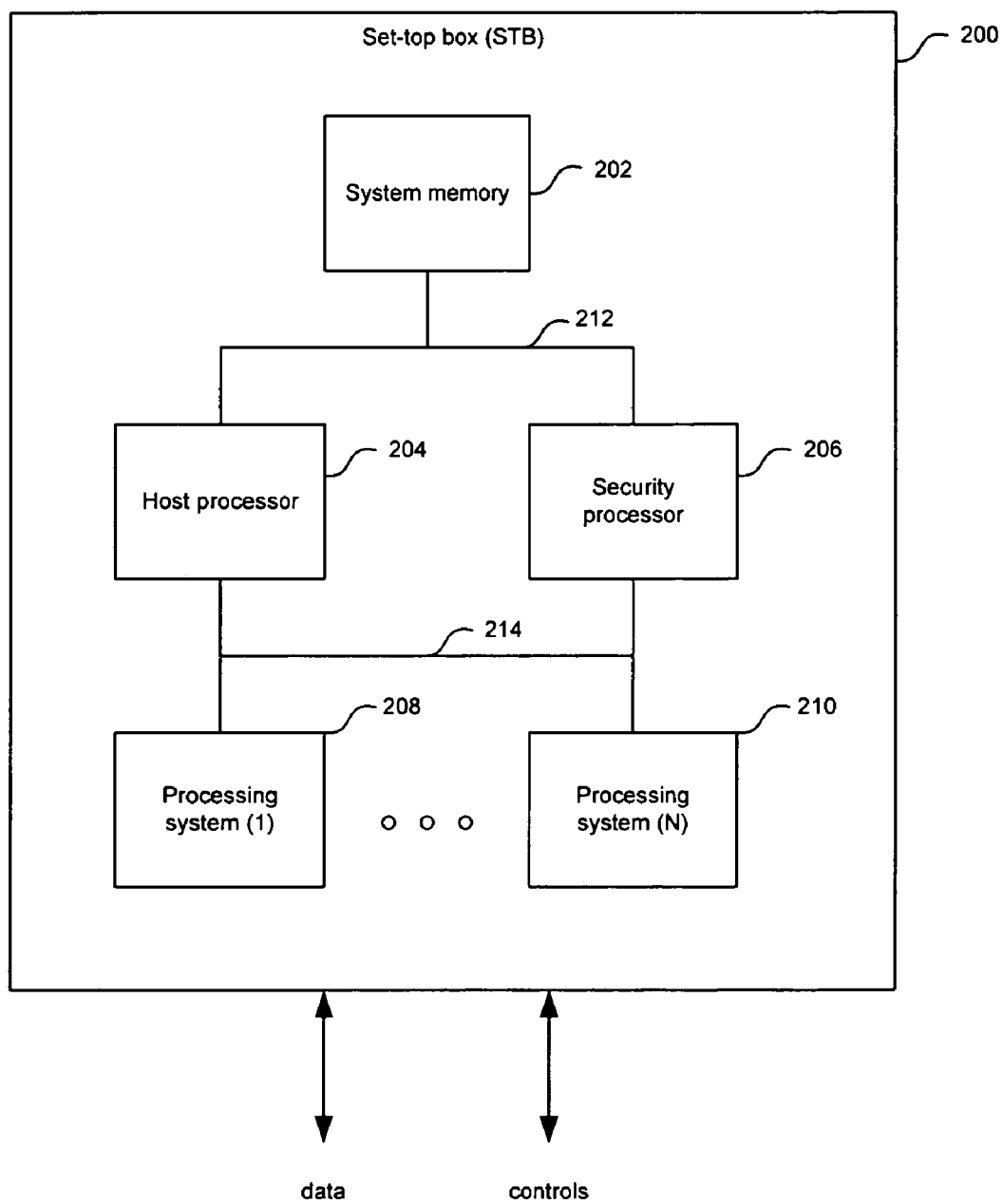
FIG. 2A is a block diagram illustrating an exemplary multimedia terminal with a security processor, in accordance with an embodiment of the invention.

FIG. 2A is a block diagram illustrating an exemplary multimedia terminal with a security processor, in accordance with an embodiment of the invention. Referring to FIG. 2A, there is shown a set-top box (STB) 200 that may comprise a host processor 204, a system memory 202, a security processor 206, a processing system 208 through a processing system 210, a memory bus 212, and a data bus 214. The STB 200 may be adapted to receive and/or transfer data from other systems and may also be adapted to receive and/or transfer control signals from other systems.

The host processor 204 may comprise suitable logic, circuitry, and/or code that may be adapted to perform data processing and/or system control operations associated with the STB 200. The host processor 204 may be adapted to communicate with the system memory 202 via, for example, the memory bus 212. The host processor 204 may also be adapted to communicate with the security processor 206 and/or the processing system 208 through the processing system 210 via, for example, the data bus 214. The system memory 202 may comprise suitable logic, circuitry, and/or code that may be adapted to store data, control information, and/or operational information. In this regard, the system memory 202 may comprise different memory technologies, for example, random access memory (RAM) and read only memory (ROM), and may be implemented utilizing separate memory devices or integrated circuits (ICs). In some instances, information associated with the security policy and/or the access control matrix may be implemented in portions of the system memory 202. For example, portions of the security policy and/or the access control matrix that may be renewed may be implemented using secure ROM or secure RAM, while those portions that may not be renewed may be implemented in hardware. In this regard, portions of the system memory 202 that comprise information regarding the security policy and/or the access control matrix may be referred to as security policy memory.

The security processor 206 may comprise suitable logic, circuitry, and/or code that may be adapted to perform multiple security operations on data received by the STB 200. The security operations may include, but need not be limited to, non-volatile memory (NVM) security, key ladders, challenge-response authentication, memory data signature verification, secure scrambler configuration, and security assurance logic, for example. In this regard, the security processor 206 may comprise a plurality of security components, which may be adapted to perform various features associated with the security operations. The processing system 208 through the processing system 210 may each comprise suitable logic, circuitry, and/or code that may be adapted to perform a plurality of processing operations on the data received by the STB 200. In this regard, individual processing systems or combinations of processing systems may operate as subsystems of the STB 200.

In operation, the security processor 206 may receive access requests from a user to perform certain data operations within the STB 200. The security processor 206 may verify access rights or privileges that the user may have to a security component in the security processor 206 based on the access control matrix. The security processor 206 may determine whether access to a security component is provided independently of the host processor 204, that is, the security processor 206 may not operate as a slave to the host processor 204. When access to the security component is verified, the security processor 206 may perform the security feature or features associated with the security component. In some instances, the security processor 206 may transfer the results of the operations associated with the security component to, for example, the host processor 204 and/or the processing system 208 through the processing system 210. Moreover, the security processor 206 may utilize information stored in the system memory 202 when performing certain security operations associated with security features. For example, the security processor 206 may utilize security policy and/or access control matrix information stored in a security policy memory to control and/or operate the STB 200. Any operation or functionality of the STB 200 not described or provided by the access control matrix may be handled by at least one of higher-level security policy information.

Figure 2B:
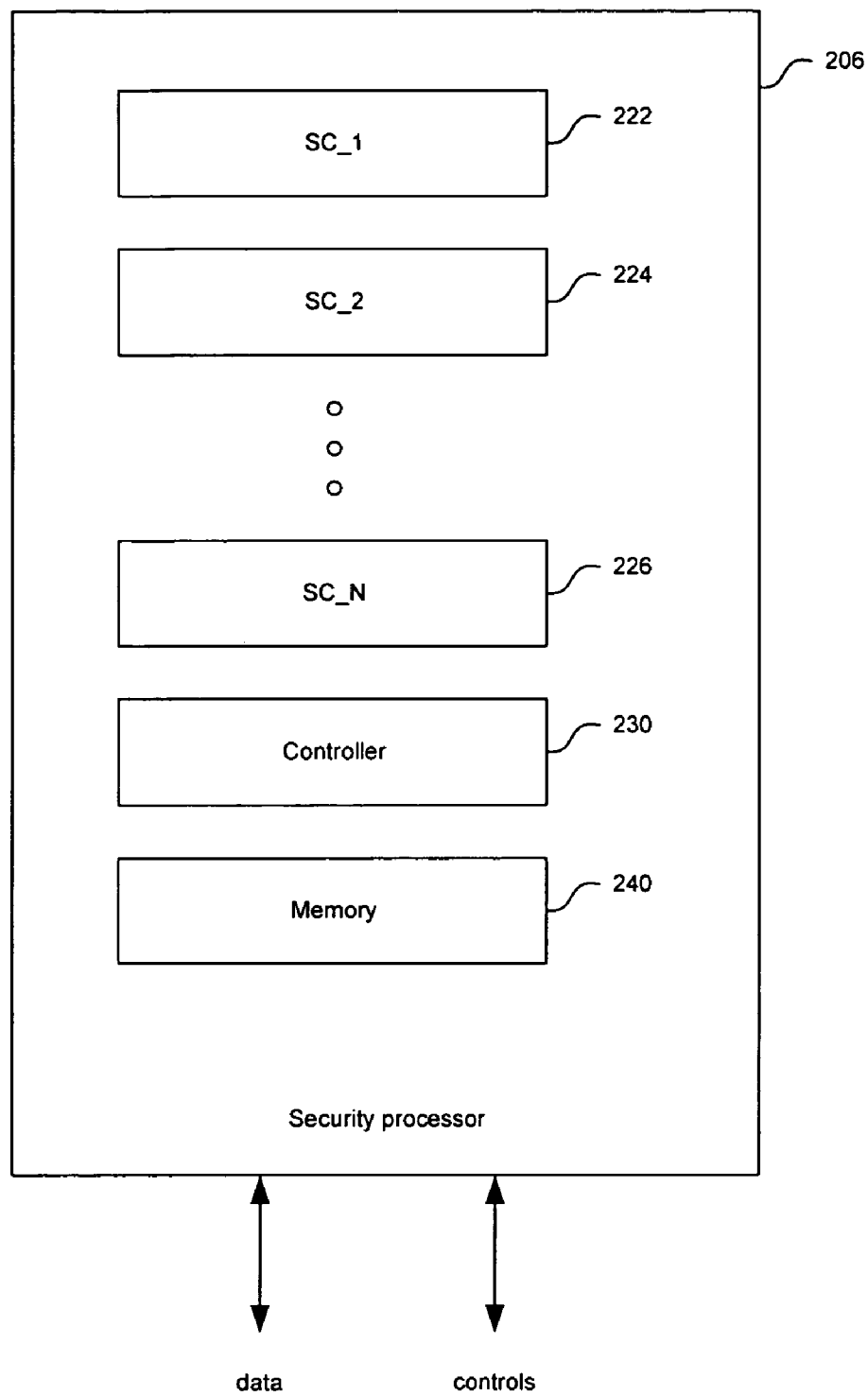
FIG. 2B is a block diagram illustrating an exemplary security processor with at least one security component, in accordance with an embodiment of the invention.

FIG. 2B is a block diagram illustrating an exemplary security processor with at least one security component, in accordance with an embodiment of the invention. Referring to FIG. 2B, the security processor 206 in FIG. 2A may comprise security components SC_1 222 through SC_N 226, a controller 230, and an internal memory 240. The security processor 206 may be adapted to receive and/or transfer data and/or control signals from other components in the STB 200 in FIG. 2A. The security components SC_1 222 through SC_N 226 may each comprise suitable logic, circuitry, and/or code that may be adapted to perform certain security features. In some instances, at least a portion of the access control matrix may be implemented in hardware in at least one of the security components SC_1 222 through SC_N 226. The controller 230 may comprise suitable logic, circuitry, and/or code that may be adapted to control the operations of the security processor 206. The internal memory 240 may comprise suitable logic, circuitry, and/or code that may be adapted to store data, control information, and/or operational information. In some instances, information associated with the security policy and/or the access control matrix may be implemented in the internal memory 240. For example, portions of the security policy and/or the access control matrix that may be renewed may be implemented using secure ROM or secure RAM, while those portions that may not be renewed may be implemented in hardware.

In determining the architecture of the security processor 206, modular decomposition techniques and bottom-up design may be utilized. For example, in the security processor 206, each of the security components SC_1 222 through SC_N 226 may be implemented as a separate security feature. Security features that may be implemented in a security component may comprise, but need not be limited to, non-volatile memory (NVM) security, key ladders, challenge-response authentication, memory data signature verification, secure scrambler configuration, and security assurance logic, for example.

An NVM security component may be adapted to allow user mode configuration, key storage and various security restrictions and operation controls, for example. A key ladder security component may be utilized as a key protection mechanism by utilizing a ladder that is formed when circulating keys through a hardware cipher accelerator that encrypts or wraps keys and then decrypts or unwraps keys, for example. The encrypted or decrypted keys may be transferred to, for example, a network descrambler, a personal video recorder (PVR) scrambler, or a scrambler for output content protection as may be restricted by the access control policy or rules in the security processor 206.

A challenge-response authentication security component may be adapted to implement pass algorithms, that is, algorithms where a secret function may be utilized to provide access, for example. The challenge-response authentication security component may also be adapted to implement one-time signed password schemes. A memory data signature verification security component may be adapted to ensure that software is from a reliable or acceptable source, for example. A secure scrambler security component may be adapted to ensure that operation modes associated with a user are protected, for example. Moreover, a security assurance security component may be adapted to protect against system security attacks, for example.

For a given user mode, the operations of the security components SC_1 222 through SC_N 228 of the security processor 206 may be driven or set up by a set of command sequences. The security processor 206 may be implemented as a strong-noninterference secure system. These operations may be deterministic and the operations of one security component may not interfere with the operations of a different security component. In other words, the command sequence associated with one security component may not generate results for a different security component.

The access control matrix for the security processor 206 may be implemented as a set of access control lists that enforce rules for each security component. In this regard, the security processor 206 may use rule-based access controls. In a rule-based access control system, a system mechanism controls access to a security component and an individual user may not alter or modify such access.

An access control list ACL(j) may be defined as a set of pairs that may be denoted as follows:

$$\left\{(i, R(i, j)): i \in U, R(i, j) \subseteq \bigcup_i R(i, j)\right\}.$$

The set of pairs for the ACL(j) may be associated with a particular security component j∈SC, where U is a set of users or user modes and SC is a set of security components and $$\bigcup_i R(i, j)$$

is a set of rights or privileges associate with the security component j. An access control SCL(j) may represent the access that a user mode i may have to a particular security component j using an access right or privilege in R(i,j).

A capability list CAP(i) may be defined as a set pairs that may be denoted as follows:

$$\left\{(i, R(i, j)): j \in SC, R(i, j) \subseteq \bigcup_j R(i, j)\right\}.$$

The set of pairs for the CAP(i) may be associated with a particular user or user mode i∈U, where $$\bigcup_j R(i, j)$$

is a set of rights for the user mode i. A capability list CAP(i) may represent the particular user mode i that may access a security component j using an access right or privilege in R(i,j). Whether using an access control list or a capability list, for a user mode i, a right or privilege provided by R(i,j) may be specified as a set of parameters and/or rules for accessing the security component j. When using access control lists to generate an access control matrix, an access control list may be specified for each security component supported by the security processor 206.

For a user mode, it may be necessary that more than one security component in a security processor be connected and/or operated together to ensure the security of at least one of the subsystems in a multimedia terminal or system. An access control policy or security policy may be utilized to determine the secure operation for a subsystem in the multimedia terminal. In this regard, an access control policy or security policy may be utilized to control and/or coordinate the operation of more than one security component for a user mode. A security policy may be implemented in an informal manner and/or may be implemented based on a highly mathematical or structured manner.

An informal approach may be based on describing an access control policy or security policy based on related issues in the operation of security components in a security processor. In this regard, the implementation of a security policy in a security processor may adopt some mixture of confidentiality and integrity guidelines. For example, the details of the security policy for each user mode may be confidential and may not be accessed in the operation of a different user mode. That is, a non-composition user mode supported by the security processor may be deterministic and may operate independently such that another user mode may not deduce any secrets about the non-composite user mode. A security policy for a non-composition user mode may refer to the operation of more than one security component associated with use by a single user while a security policy for a composition user mode may refer to the operation of more than one security component associated with the concurrent use by more than one user. When all user modes are non-composition user modes the security processor may be said to implement a strong noninterference-secure system. While the access control policies for a user mode may be deterministic they need not be static.

A high-level security policy for a security processor may be based on requirements provided by system users. For example, a security policy may be derived from requirements that are based on the need for secure keys protected by strong crypto hardware engines, the use of security logics for key table protection, the need for secure session key generating processes, and/or the acceptance of selected commands relevant to a specific user mode. Moreover, the security policy may also be derived from requirements that are based on the application of rule-based access controls, the protection of the set-top box system software via crypto signature verification, the secure operation controls and/or test mode controls, and/or the security level of each security component, for example. The security policy may also be derived from requirements that are based on the operation of a master controller with secure RAM and/or ROM code which operates overall security system functions, for example.

The use of a security policy enables an access control matrix based on access control lists or capability lists to be more efficient than a two-dimensional access control matrix because only information to relevant security components for specified user modes may be described. Access control operations and security oversight not specified by the access control matrix may be specified by the security policy. For example, the access control matrix in the security layer structure 120 in FIG. 1B may be complemented by information in the security policy. In this regard, the security policy may implement a default secure mode of operation for the STB 200 in FIG. 2A and the access control matrix may be utilized to modify certain portions of the default mode of operation. Those aspects of security not supported by the access control matrix may then be supported by the default mode of operation. This approach also provides flexibility for utilizing a security processor in a variety of operating conditions and for various users and/or combinations of users.

Figure 3:
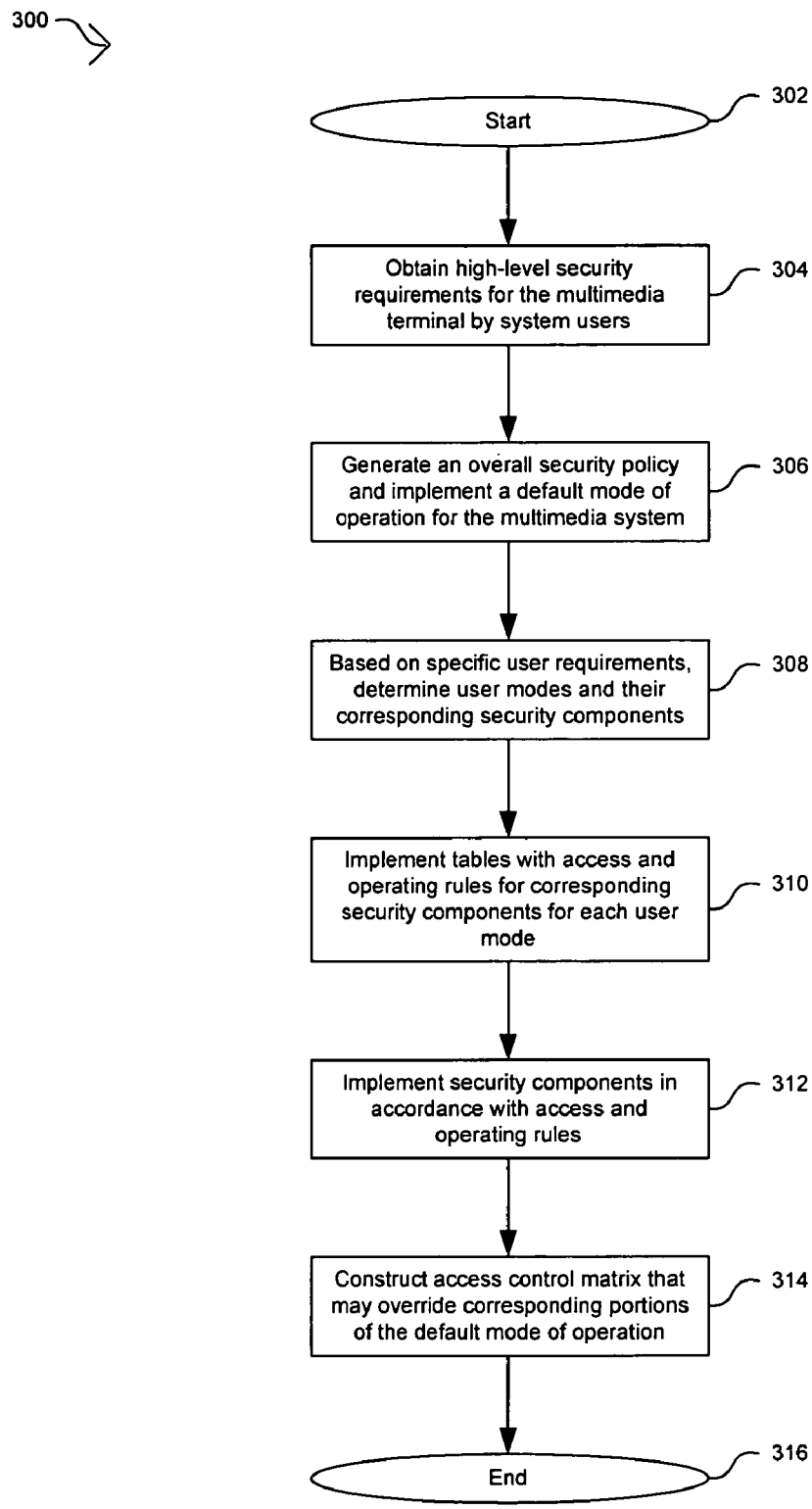
FIG. 3 is a flow diagram illustrating exemplary steps for generating a security policy and an access control matrix for a multimedia terminal, in accordance with an embodiment of the invention.

FIG. 3 is a flow diagram illustrating exemplary steps for generating a security policy and an access control matrix for a multimedia terminal, in accordance with an embodiment of the invention. Referring to FIG. 3, after start step 302, in step 304, high-level requirements by system users may be obtained regarding the secure operations needed for a multimedia terminal such as a set-top box, for example. In step 306, an overall security policy for the security processor in the multimedia terminal may be generated and may be implemented by a default mode of operation. In step 308, specified users may indicate their security requirements and corresponding security components from the security processor may be identified to support the user modes. In step 310, tables may be implemented or created that comprise access and/or control rules for the operation of a security component associated with a user mode. In step 312, the security components may be implemented, that is, the appropriate mode of operation may be determined for a user mode, in accordance with the rules established in step 310. In step 314, the access control lists or capability lists that comprise the access or control rules for a security component by a specified user mode may be combined to construct an access control matrix for the security processor. After step 314, the flow diagram 300 may proceed to end step 316.

As described above, the default mode of operation generated in step 306 and the access control matrix constructed in step 314 may be utilized to provide the secure operation of a multimedia terminal such as the STB 200 in FIG. 2A. The generation of the access control rules for a user mode may depend on the architecture and/or implementation of the security components in the security processor.

Figure 4:
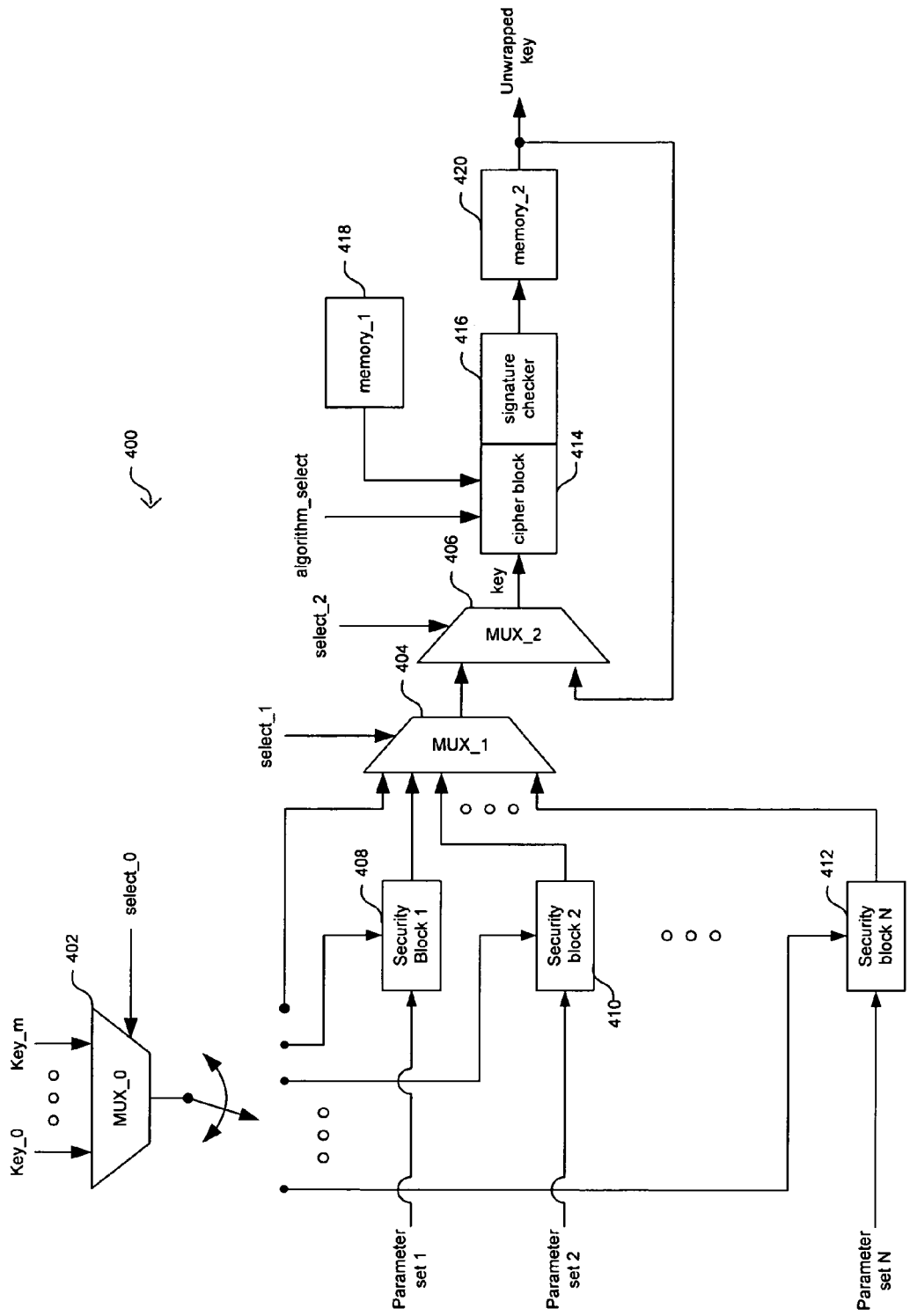
FIG. 4 is a block diagram illustrating an exemplary key ladder security component, in accordance with an embodiment of the invention.

FIG. 4 is a block diagram illustrating an exemplary key ladder security component, in accordance with an embodiment of the invention. Referring to FIG. 4, there is shown a key ladder system 400 that may be implemented in a key ladder security component for providing keys to network descramblers for removing network encryption on incoming transport streams. The types of network descramblers may include, but need not be limited to, advanced encryption standard 128 (AES-128), data encryption standard (DES), digital video broadcasting (DVB), and Multi2.

The key ladder system 400 may comprise a first multiplexer (MUX_0) 402, a second multiplexer (MUX_1) 404, a third multiplexer (MUX_2) 406, security_block_1 408 through security_block_N 412, a cipher block 414, a signature checker 416, a first memory (memory_1) 418, and a second memory (memory_2) 420.

The MUX_0 402 may comprise suitable logic, circuitry, and/or code that may be adapted to select a key from the input keys key_0 through key_m. A selection signal, select_0, may be utilized to select the key. The output of the MUX_0 402 may be transferred to at least one of the security_block_1 408 through security_block_N 412 and/or to the MUX_1 404. The security_block_1 408 through security_block_N 412 may each comprise suitable logic, circuitry, and/or code that may be adapted to be receive a parameter set and may be utilized as user specific key protection blocks. For example, the security_block_1 408 may receive parameter set 1 while security_block_N 412 may receive parameter set N. The output of each of the security_block_1 408 through security_block_N 412 may be transferred to the MUX_1 404 for selection.

The MUX_1 404 may comprise suitable logic, circuitry, and/or code and may be adapted to select a key from the MUX_0 402 or from the security_block_1 408 through security_block_N 412. A selection signal, select_1, may be utilized to select from one of the inputs to the MUX_1 404. The MUX_2 406 may comprise suitable logic, circuitry, and/or code that may be adapted to select the output of the MUX_1 404 or the output of the memory_2 420. In this regard, the MUX_2 406 may be utilized in the key ladder operation to enable the feedback that allows a key, which has been previously encrypted or decrypted, to be encrypted or decrypted again.

The cipher block 414 may comprise suitable logic, circuitry, and/or code that may be adapted to encrypt or decrypt an input key from the MUX_2 406 by utilizing an encrypted and signed key from the memory_1 418. The cipher block 414 may support, but need not be limited to, the ciphering algorithms triple DES (3DES), AES-128, 3DES with signature checking, and AES-128 with signature checking. A selection signal, algorithm_select, may be utilized to select the ciphering algorithm for encryption or decryption. The signature checker 416 may comprise suitable logic, circuitry, and/or code that may be adapted to verify the signature when utilizing, for example, the 3DES with signature checking or AES-128 with signature checking. The memory_2 420 may comprise suitable logic, circuitry, and/or code that may be adapted to store the output of the signature checker 416. When the signature checker 510 is not enabled or is not utilized, the memory_2 420 may store the response from the cipher block 414.

TABLE 2

Key map.

| Parameter set 1 | Parameter set 2 | ... | Parameter set N | key entry |
|---|---|---|---|---|
| 0~m | 0~n | ... | 0~p | Key_0 |
| ... | ... | ... | ... | ... |
| 0~m | 0~n | ... | 0~p | Key_m |
| ... | ... | ... | ... | ... |

For the user mode illustrated in FIG. 4, for example, a set of tables may be utilized to determine or define the rights or privileges for the access control list. For example, Table 2 may illustrate a key assignment map for the key ladder system 400. In Table 2, the parameters sets need not be of the same size. For example, parameter set 1 may range from 0 to m while parameter set N may range from 0 to p. In each case, the parameter set is associated with a key entry from the MUX_0 402. Table 3 may illustrate access control rules for the operation of the key ladder system 400 and Table 4 may illustrate memory routing addresses for the output of each level of the key ladder system 400.

In Table 3, the select_0 and select_1 signals may select from (N+1) inputs to the MUX_0 402 and the MUX_1 404 respectively. The select_2 signal may select from two inputs to the MUX_2 406. The algorithm_select signal may select from four ciphering algorithms supported by the cipher block 414. In Table 4, the first address, Addr0, illustrates that the output of the key ladder system 400 may be transferred to a scrambler or descrambler table.

TABLE 3

Specifications of operation of the key ladder.

| select_0 | select_1 | Select_2 | algorithm_select | memory_2 address |
|---|---|---|---|---|
| 0~N | 0~N | 0~1 | 0~3 | Addr0~Addr2 |
| ... | ... | ... | ... | ... |
| 0~N | 0~N | 0~1 | 0~3 | ... |
| ... | ... | ... | ... | ... |

TABLE 4

Output key routing table.

| memory_2 address | Destination |
|---|---|
| Addr0 | Scrambler or descrambler key table |
| Addr1 | ... |
| Addr2 | ... |
| ... | ... |

There may be multiple key ladders required as multiple user modes may utilize this security feature. In this regard, for each key ladder supported by the security processor 206 the previous set of tables, Table 2 through Table 4, may need to be specified.

Figure 5:
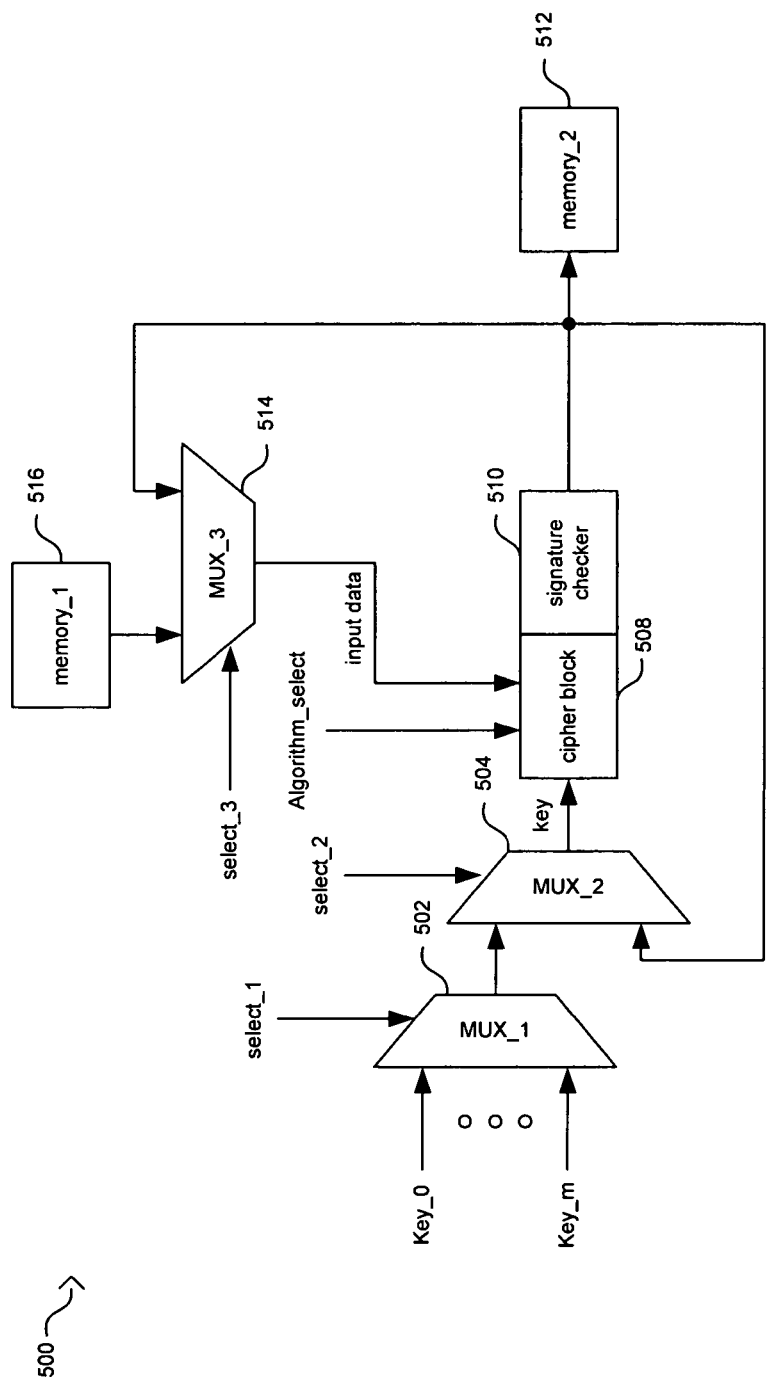
FIG. 5 is a block diagram illustrating an exemplary challenge-response security component, in accordance with an embodiment of the invention.

FIG. 5 is a block diagram illustrating an exemplary challenge-response security component, in accordance with an embodiment of the invention. Referring to FIG. 5, there is shown a challenge-response system 500 that may comprise a first multiplexer (MUX_1) 502, a second multiplexer (MUX_2) 504, a third multiplexer (MUX_3) 506, a cipher block 508, a signature checker 510, a first memory (memory_1) 512, and a second memory (memory_2) 514.

The MUX_1 502 may comprise suitable logic, circuitry, and/or code that may be adapted to select a key from the input keys key_0 through key_m. A selection signal, select_1, may be utilized to select the key. The output of the MUX_1 502 may be transferred to the MUX_2 504. The MUX_2 504 may comprise suitable logic, circuitry, and/or code and may be adapted to select the output from the MUX_1 502 or from the signature checker 510. When the signature checker 510 is not enabled or is not utilized, the MUX_2 504 may receive the output of the cipher block 508. In this regard, the MUX_2 504 may be utilized to enable a feedback operation in the challenge-response system 500. The MUX_3 506 may comprise suitable logic, circuitry, and/or code that may be adapted to select from the output of the memory_1 512 or from the output of the signature checker 510. When the signature checker 510 is not enabled or is not utilized, the MUX_3 506 may receive the output of the cipher block 508.

The cipher block 508 may comprise suitable logic, circuitry, and/or code that may be adapted to encrypt or decrypt an input key from the MUX_2 504 by utilizing a response or nonce from the MUX_3 506. The cipher block 508 may support, but need not be limited to, the ciphering algorithms triple DES (3DES), AES-128, 3DES with signature checking, and AES-128 with signature checking. A selection signal, algorithm_select, may be utilized to select the ciphering algorithm for encryption or decryption. The signature checker 510 may comprise suitable logic, circuitry, and/or code that may be adapted to verify the signature when utilizing, for example, the 3DES with signature checking or AES-128 with signature checking. The memory_2 514 may comprise suitable logic, circuitry, and/or code that may be adapted to store the response from the signature checker 416. When the signature checker 510 is not enabled or is not utilized, the memory_2 514 may store the response from the cipher block 508.

The access control list for a challenge-response security component based on the challenge-response system 500 may be specified in a similar manner as described for the key ladder system 400. For example, the user mode implemented by the challenge-response system 500 may utilize a set of tables similar to Table 2 through Table 4.

Figure 6:
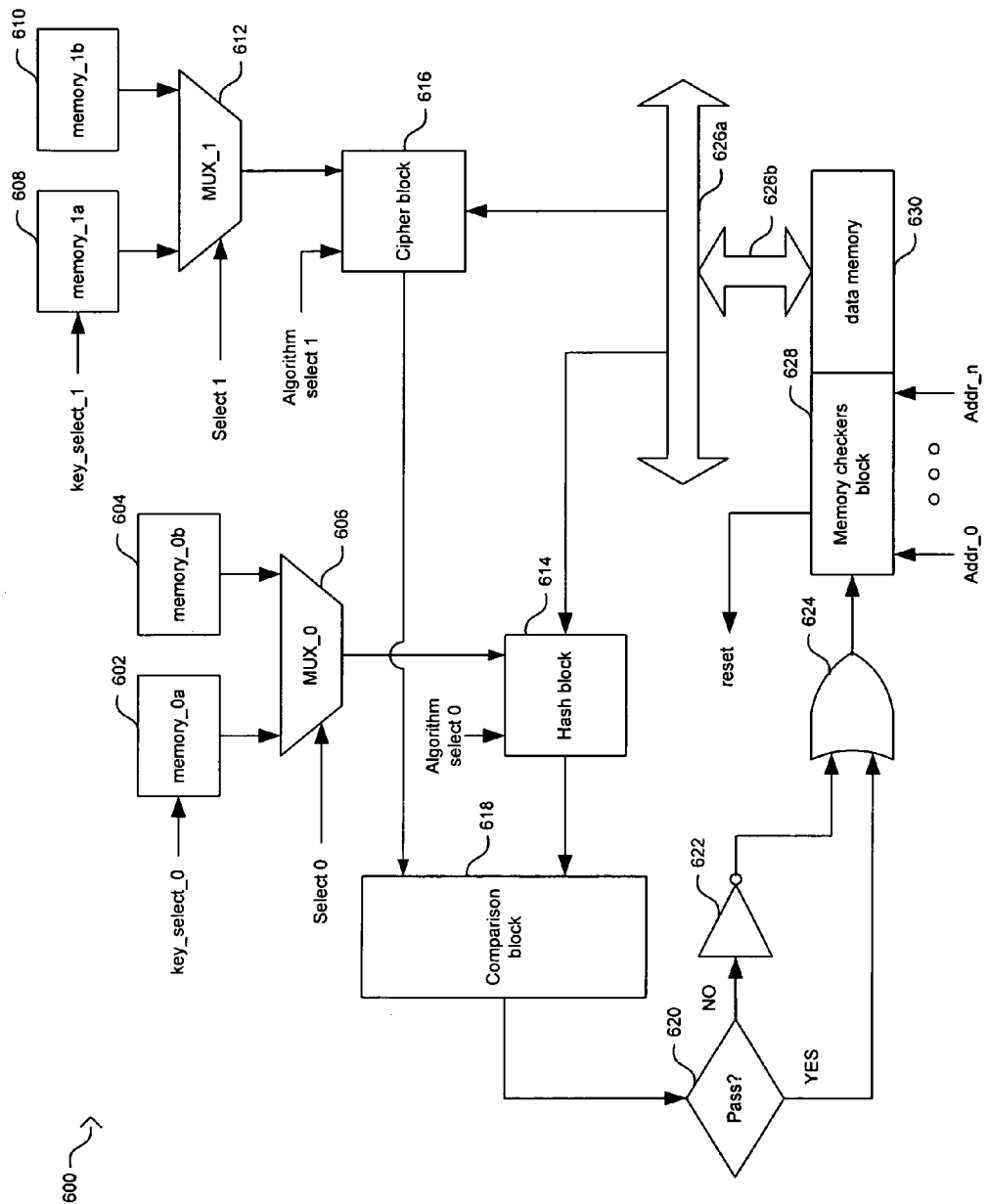
FIG. 6 is a block diagram illustrating an exemplary memory data signature verification security component, in accordance with an embodiment of the invention.

FIG. 6 is a block diagram illustrating an exemplary memory data signature verification security component, in accordance with an embodiment of the invention. Referring to FIG. 6, there is shown a memory data signature verification system 600 that comprises a first memory (memory_0a) 602, a second memory (memory_0b) 604, a third memory (memory_1a) 608, a fourth memory (memory_1b) 610, a first multiplexer (MUX_0) 606, a second multiplexer (MUX_1) 612, a hash block 614, a cipher block 616, a comparison block 618, a decision block 620, an inverter 622, an OR gate 624, a first bus 626a, a second bus 626b, a memory checkers block 628, and a data memory 630.

The memory_0a 602 may comprise suitable logic, circuitry, and/or code that may be adapted to store multiple keys. The memory_0a 602 may be implemented utilizing a read only memory (ROM), for example. A selection signal, key_select_0, may be utilized to select a key from the memory_0a 602. The memory_0b 604 may comprise suitable logic, circuitry, and/or code that may be adapted to store software loadable keys. In this regard, the memory 0b 604 may be implemented utilizing a random access memory (RAM), for example. The MUX_0 606 may comprise suitable logic, circuitry, and/or code that may be adapted to select the output of the memory_0a 602 or the output of the memory_0b 604. A selection signal, select_0, may be utilized to make the selection. The output of the MUX_0 606 may correspond to a possible key and may be transferred to the hash block 614.

The memory_1a 608 may comprise suitable logic, circuitry, and/or code that may be adapted to store multiple keys. The memory_1a 608 may be implemented utilizing a read only memory (ROM), for example. A selection signal, key_select_1, may be utilized to select a key from the memory_1a 608. The memory_1b 610 may comprise suitable logic, circuitry, and/or code that may be adapted to store software loadable keys. In this regard, the memory_1b 610 may be implemented utilizing a random access memory (RAM), for example. The MUX_1 612 may comprise suitable logic, circuitry, and/or code that may be adapted to select the output of the memory_1a 608 or the output of the memory_1 610. A selection signal, select_1, may be utilized to make the selection. The output of the MUX_1 612 may correspond to a key and may be transferred to the cipher block 616.

The cipher block 616 may comprise suitable logic, circuitry, and/or code that may be adapted to encrypt or decrypt the output from the MUX_1 612 by utilizing input data obtained from the data memory 630 via the first bus 626a and the second bus 626b. The cipher block 616 may support, but need not be limited to, the ciphering algorithms AES and Rivest-Shamir-Adleman (RSA). A selection signal, algorithm_select_1, may be utilized to select the ciphering algorithm for encryption or decryption. The hash block 614 may comprise suitable logic, circuitry, and/or code that may be adapted to perform a hashing algorithm on the output from the MUX_0 606 by utilizing input data obtained from the data memory 630 via the first bus 626a and the second bus 626b. A hashing algorithm is a mathematical operation that converts an arbitrary length input into a fixed length output. The hash block 614 may support, but need not be limited to, the secure hashing algorithm (SHA1). A selection signal, algorithm_select_0, may be utilized to select the hashing algorithm.

The compare block 618 may comprise suitable logic, circuitry, and/or code that may be adapted to compare the output of the hash block 614 and the output of the cipher block 616. When the outputs are the same, the operation of the compare block 618 may generate a pass signal. When the outputs are not the same, the operation of the compare block 618 may generate a fail signal. The decision block 620 may comprise suitable logic, circuitry, and/or code that may be adapted to determine whether a pass signal was generated by the compare block 620. When a pass signal is detected, the decision block 620 may generate a YES signal that may be transferred to the OR gate 624. When the pass signal is not detected, the decision block 620 may generate a NO signal that may be transferred to the OR gate 624 via the inverter 622. The output of the OR gate 624 may be utilized to enable or disable the memory checkers block 628. The memory checkers block 628 may comprise suitable logic, circuitry, and/or code that may be adapted to determine whether an illegal memory access has been attempted. When an illegal memory access has been attempted, the memory checkers block 628 may generate a reset signal to indicate the illegal memory access.

For the user mode illustrated in FIG. 6, for example, Table 5 may be utilized to determine or define the rights or privileges for the access control list. In Table 5, RAM0 may correspond to a RAM implementation of the memory_0b 604 and RAM1 may correspond to a RAM implementation of the memory_1b 610. In this regard, RAM0 and RAM1 may comprise predetermined addresses, for example. The keys in the RAM0 and RAM1 may be unwrapped, for example, by a key ladder security component.

TABLE 5

| Access table for memory data signature verification. | | | | | | | | |
|---|---|---|---|---|---|---|---|---|
| Select 0 | Select 1 | Key select 0 | Key select 1 | RAM0 key | RAM1 key | Alg. Select 0 | Alg. Select 1 | Memory type and address |
| 0~1 | 0~1 | 0~p | 0~q | Allow or not | Allow or not | 0~m | 0~n | Data and signature address range |
| ... | ... | ... | ... | ... | ... | ... | ... | ... |
| ... | ... | ... | ... | ... | ... | ... | ... | ... |

Other security components, including but not limited to, secure scrambler security components, security assurance security components, or secure non-volatile memory (NVM) security components may be implemented following a similar approach as described herein. The secure scrambler security component and the security assurance security component, for example, may be implemented via secure NVM operation control bits.

Table 6 illustrates an example of specifying scramblers associated with hardware modules in a set-top box such that proper security levels may be ensured for the user. In this regard, Table 6 may specify whether a scrambler may be disabled or enabled for a particular hardware module in a set-top box. Table 6 illustrates various scramblers, such as DES scrambler for conditional access and interface protection, a DES-ABC scrambler for PVR copy protection, a high-bandwidth digital content protection (HDCP) scrambler for high-definition multimedia interfaces (HDMI), or a synchronous DRAM (SDRAM) scrambler for memory protection. The DES scrambler may be operated in either an electronic codebook (ECB) mode or cipher block chaining (CBC) mode, for example. Other types of scramblers may also be utilized for the secure scrambler security component.

TABLE 6

Scrambler configuration table.

| Hardware module | Scrambler | Operation module | Initialization/ Termination | Disable |
|---|---|---|---|---|
| Conditional access | DES | ECB | Termination block processing, short clear data block | Yes or No |
| Conditional access | DES | CBC | IV, Termination block processing, short clear data block | ... |
| ... | ... | ... | ... | ... |
| PVR copy protection | 3DES-ABC | ECB | Short clear data block | ... |
| ... | ... | ... | ... | ... |
| Interface protection | DES | ECB | Short clear data block | ... |
| ... | ... | ... | ... | ... |
| HDMI | HDCP | N/A | N/A | ... |
| Memory | SDRAM scrambler | N/A | N/A | ... |

In another embodiment of the security processor 206, the access control matrix may be generated based on capacity lists. Capacity lists may be generated based on rights or privileges indicated in tables in a similar manner as illustrated for access control lists.

In some instances, the access control matrix may support user modes that correspond to instances when more than one user mode may be required to operate together in order to provide certain security features to the multimedia terminal or system. In this regard, the concurrent operation of more than one user mode may be referred to as a composed or composition user mode. When at least two different user modes of the security processor have conflicting access control needs for common security components, selecting an appropriate access control rule may be necessary for the security processor to properly operate the common security components in the composition user mode without compromising security operations. An exemplary approach may be to establish a first requirement which stipulates that a priority of the access control rules for the same security component be pre-determined among the user modes under composition. When two or more access control rules for a security component from different individual user modes present a conflict, the rules with the highest priority will correspond to the access control rule for the composition user mode. Moreover, when two or more access control rules for a security component from different individual user modes do not present a conflict, the access control rules from the individual user modes will be concurrently applicable to the security component. In this regard, when a security processor separates all user modes, including composed user modes, and only operates one user mode per deployment, it may be referred to as a strong noninterference-secure system. An access control matrix that includes individual user modes and/or composition user modes may be implemented in, for example, a security policy memory, such as ROM.

Figure 7A:
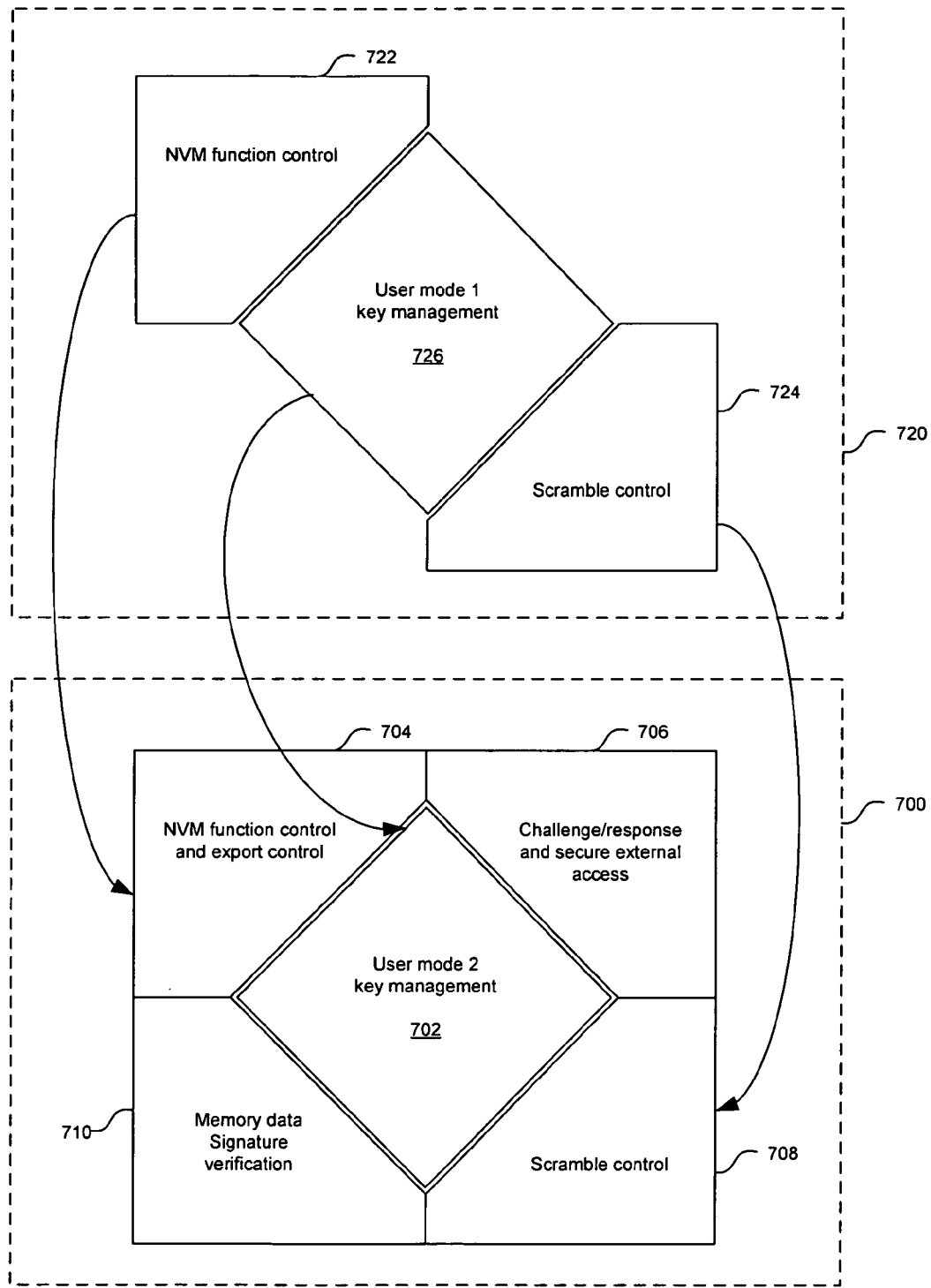
FIGS. 7A-7B illustrate an exemplary composition of a first user mode and a second user mode, in accordance with an embodiment of the invention.
Figure 7B:
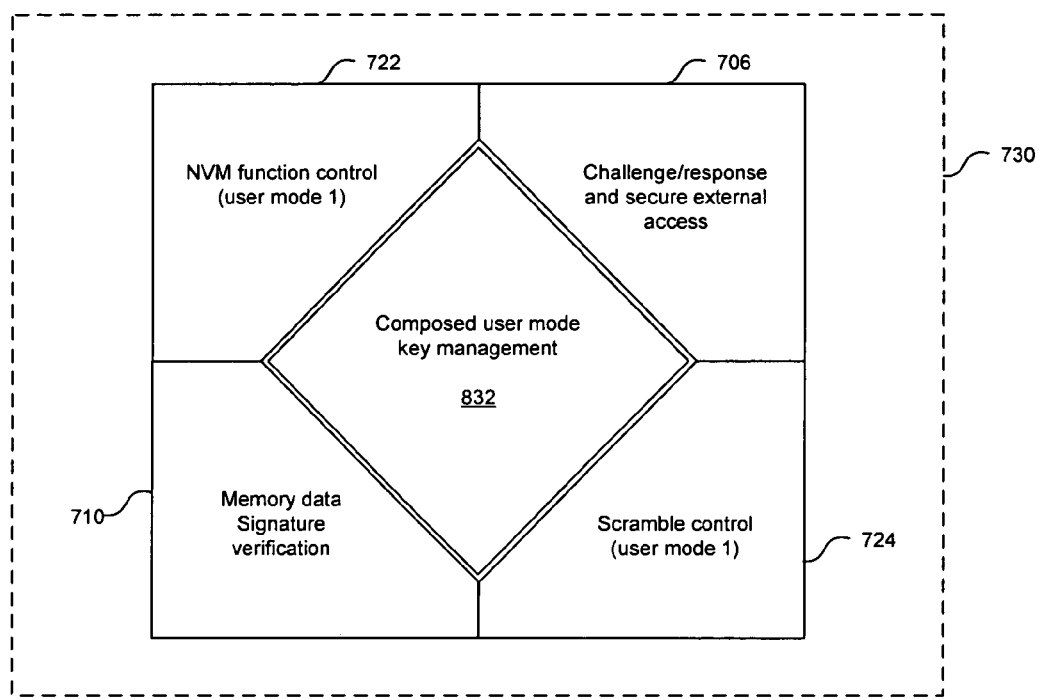

FIGS. 7A-7B illustrate an exemplary composition of a first user mode and a second user mode, in accordance with an embodiment of the invention. Referring to FIG. 7A, there is shown a second user mode 700, or user mode 2, and a first user mode 720, or user mode 1. The second user mode 700 may comprise a set of access rules such as NVM function control and export control rules 704, challenge/response and secure external access rules 806, scramble control rules 708, memory data signature verification rules 710, and user mode 2 key management rules 702. The user mode 2 key management rules 702 may comprise conditional access rules, interface copy protection rules, and PVR copy protection rules, for example. The rules in the second user mode 700 may control the operation of the security components in the security processor that may be utilized by the second user mode. These rules may be utilized in determining an access control matrix for the security processor that supports the second user mode 700.

The first user mode 720 may comprise a set of access rules such as NVM function control rules 722, scramble control rules 724, and user mode 1 key management rules 726. The user mode 1 key management rules 726 may comprise conditional access rules and PVR copy protection rules, for example. The rules in the first user mode 720 may control the operation of the security components in the security processor that may be utilized by the first user mode. These rules may be utilized to determine an access control matrix for the security processor that supports the first user mode 720.

In this example, a composition user mode may be generated by given priority to at least some of the rules utilized by user mode 1 over the rules utilized by user mode 2. For example, the NVM function control rules 722 may have priority in a composition user mode over the NVM function control and export control rules 704. The scramble control rules 724 may have priority in a composition user mode over the scramble control rules 708. The user mode 1 key management rules 726 may have priority in a composition mode over the user mode 2 key management rules 702.

Referring to FIG. 7B, there is shown a composition user mode 730 that may be generated by combining the access rules from user mode 1 and the access rules from user mode 2 in accordance with the established priority. In this regard, the composition user mode 730 may comprise the NVM function control rules 822 from user mode 1, the challenge/response and secure external access rules 806 from user mode 2, the scramble control rules 724 from user mode 1, the memory data signature verification rules 710 from user mode 2, and the composed user mode key management rules 732. The composed user mode key management rules 732 may comprise the user mode 1 key management rules 726 and the user mode 2 key management rules 702, for example. The rules in the composition user mode 730 may control the operation of the security components in the security processor that may be utilized by the composition user mode. These rules may be utilized in determining an access control matrix for the security processor that supports the composition user mode 730.

Figure 8:
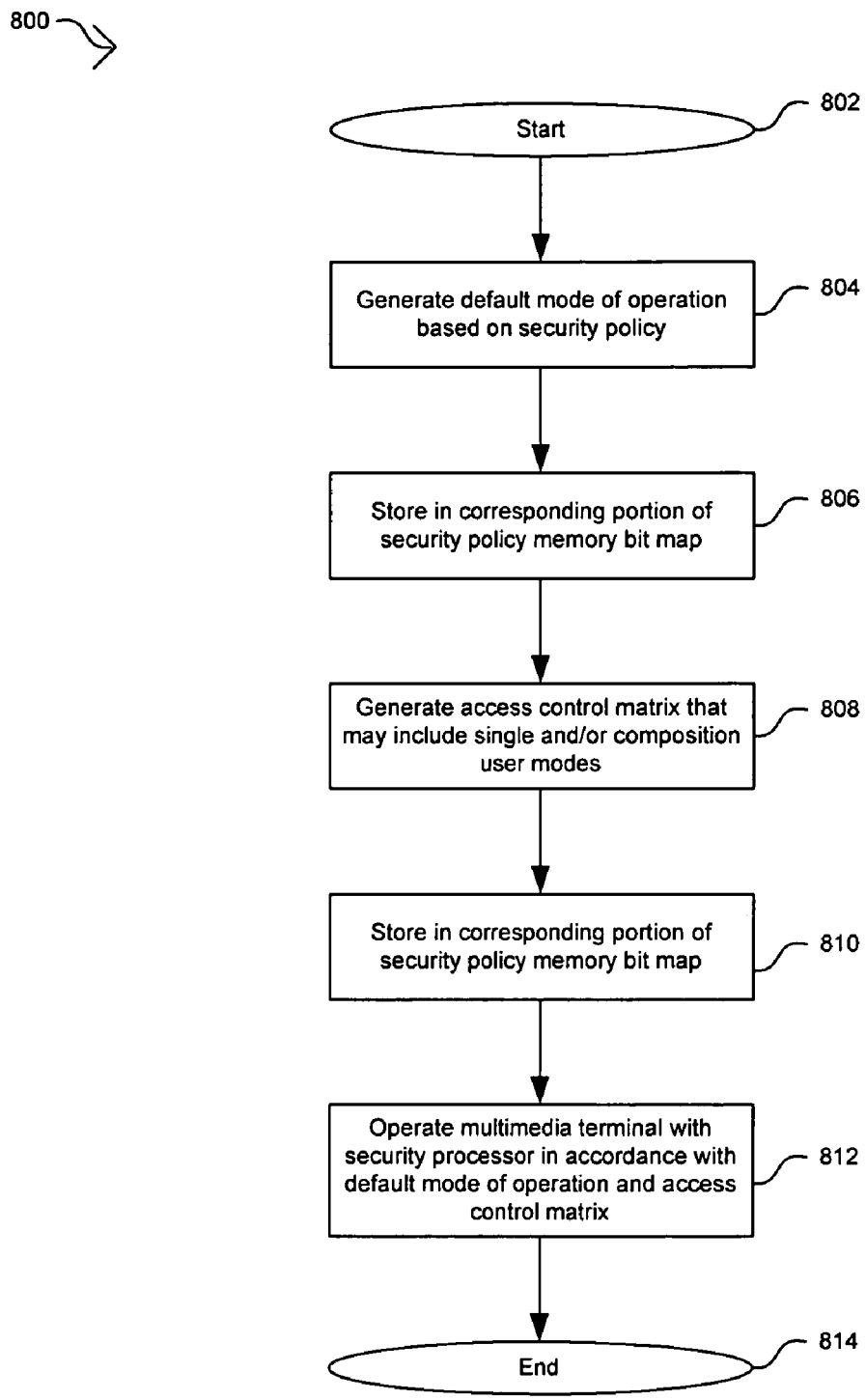
FIG. 8 is a flow diagram illustrating enforcement of a security policy and an access control matrix, in accordance with an embodiment of the invention.

FIG. 8 is a flow diagram illustrating enforcement of a security policy and an access control matrix, in accordance with an embodiment of the invention. Referring to FIG. 8, after start step 802, in step 804, the default mode of operation may be generated based on the security policy to be followed. In step 806, the default mode of operation may be stored in, for example, a one-time programmable (OTP) memory. The OTP memory may correspond to the security policy memory. In this regard, a bit map of the security policy memory may be implemented in order to enforce the default mode of operation. The security policy memory may include sections such as user mode configuration bits, root chip identification (ID) and symmetric keys, other identification information and symmetric and/or asymmetric keys, initial configuration bits for a memory data signature verification process, challenge-response control bits, user control bits, other control bits such as secure scrambler disable and other chip-specific function enable bits, for example. Other sections that may be implemented include secret key generation bits, control bits for symmetric-key ciphers such as DES and AES, true random number generator bits, control bits for asymmetric-key ciphers such as RSA, control bits for secure hashing algorithms such as SHA1, control bits for secure buses, and/or bits for security processor master controller with RAM and/or ROM code, for example.

In step 808, the access control matrix may be generated. The access control matrix may be adapted to support individual user modes as well as composition user modes. In step 810, the access control matrix may be stored in, for example, a portion of the security policy memory. In this regard, at least a portion of the security policy memory bit map may be associated with the access control matrix. Moreover, in some instances, information associated with the access control matrix may override information associated with the security police stored in step 806. In step 812, the multimedia terminal may be operated in accordance with the information provided by both the default mode of operation, that is, the security policy, and the information provided by the access control matrix. After step 812, the flow diagram 800 may proceed to end step 814.

The section of the security policy memory bit map that comprises the user mode configuration bits may be utilized to enforce the separation of operations for each user mode including composition user modes. For example, the user mode configuration bits may include a first portion, mode_config, and a second portion, mode_config_ext, in order to prevent a single point failure. The mode_config bits may be readable by, for example, the host processor 204 in FIG. 2A while the mode_config_ext bits may be readable by, for example, the security processor controller 230 in FIG. 2B. The controller 230 may read the mode_config_ext bits for detecting mode configuration errors, for example. In addition, portions of the security policy memory bit map that include the keys and control bits for a specific user mode may be programmed and/or protected to securely enable all applicable security components of the security processor, such as key ladders and challenge-response, for example. Moreover, data interfaces within the STB 200 in FIG. 2A may be protected by security policy memory enable and/or disable bits and/or by the security processor challenge-response process.

The use of security policies, enforcing mechanisms, and the creation of composition user modes may provide the necessary confidentiality and integrity in a multimedia terminal while allowing for a wide range of operating conditions.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for operating secure multimedia devices, the method comprising:
    generating a bit map in a security policy memory, wherein said bit map is used to store information for controlling one or more modes of operation of a plurality of security components in a security processor;
    storing in a first section of said generated bit map, information corresponding to a default mode of operation for each of said plurality of security components in said security processor; and
    storing in a second section of said generated bit map, information corresponding to an access control matrix, wherein said stored access control matrix information overrides at least a portion of a stored default mode of operation information for at least one of said plurality of security components.

2. The method according to claim 1, comprising retrieving at least a portion of said stored access control matrix information by said security processor.

3. The method according to claim 1, comprising retrieving at least a portion of said stored default mode of operation information by said security processor.

4. The method according to claim 1, wherein said stored access control matrix information comprises information corresponding to a composition user mode.

5. The method according to claim 1, wherein said generated bit map comprises at least one user mode configuration bit.

6. The method according to claim 5, wherein said at least one user mode configuration bit comprises at least one internal mode configuration bit and at least one external mode configuration bit.

7. The method according to claim 6, comprising accessing said at least one external mode configuration bit via a processor.

8. The method according to claim 1, wherein said generated bit map comprises at least one root chip identification (ID) bit.

9. The method according to claim 1, wherein said generated bit map comprises at least one symmetric key bit.

10. The method according to claim 1, wherein said generated bit map comprises at least one asymmetric key bit.

11. The method according to claim 1, wherein said generated bit map comprises at least one initial configuration bit for a data signature verification process.

12. The method according to claim 1, wherein said generated bit map comprises at least one challenge-response control bit.

13. The method according to claim 1, wherein said generated bit map comprises at least one secure scrambler control bit.

14. A system for operating secure multimedia devices, the system comprising:
- one or more circuits and/or processors that comprise a security processor and a security policy memory;
- said security processor comprising a plurality of security components;
- said security policy memory is operable to support generation of a bit map in said security policy memory for storing information for controlling one or more modes of operation of said plurality of security components in said security processor;
- said one or more circuits and/or processors are operable to store in a first section of said generated bit map, information corresponding to a default mode of operation for each of said plurality of security components in said security processor; and
- said one or more circuits and/or processors are operable to store in a second section of said generated bit map, information corresponding to an access control matrix, wherein said stored access control matrix information overrides at least a portion of a stored default mode of operation information for at least one of said plurality of security components.

15. The system according to claim 14, wherein said security processor retrieves at least a portion of said stored access control matrix information.

16. The system according to claim 14, wherein said security processor retrieves at least a portion of said stored default mode of operation.

17. The system according to claim 14, wherein said stored access control matrix information comprises information corresponding to a composition user mode.

18. The system according to claim 14, wherein said generated bit map in said security policy memory comprises at least one user mode configuration bit.

19. The system according to claim 18, wherein said at least one user mode configuration bit comprises at least one internal mode configuration bit and at least one external mode configuration bit.

20. The system according to claim 19, wherein said one or more circuits and/or processors comprise at least one processor that accesses said at least one external mode configuration.

21. The system according to claim 14, wherein said generated bit map in said security policy memory comprises at least one root chip identification (ID) bit.

22. The system according to claim 14, wherein said generated bit map in said security policy memory comprises at least one symmetric key bit.

23. The system according to claim 14, wherein said generated bit map in said security policy memory comprises at least one asymmetric key bit.

24. The system according to claim 14, wherein said generated bit map in said security policy memory comprises at least one initial configuration bit for a data signature verification process.

25. The system according to claim 14, wherein said generated bit map in said security policy memory comprises at least one challenge-response control bit.

26. The system according to claim 14, said generated bit map in said security policy memory comprises at least one secure scrambler control bit.

* * * * *